Nov. 18, 1969 J. MATTERN 3,479,601
BALANCED SQUARE-LAW MICROWAVE MIXER
Filed Oct. 5, 1966
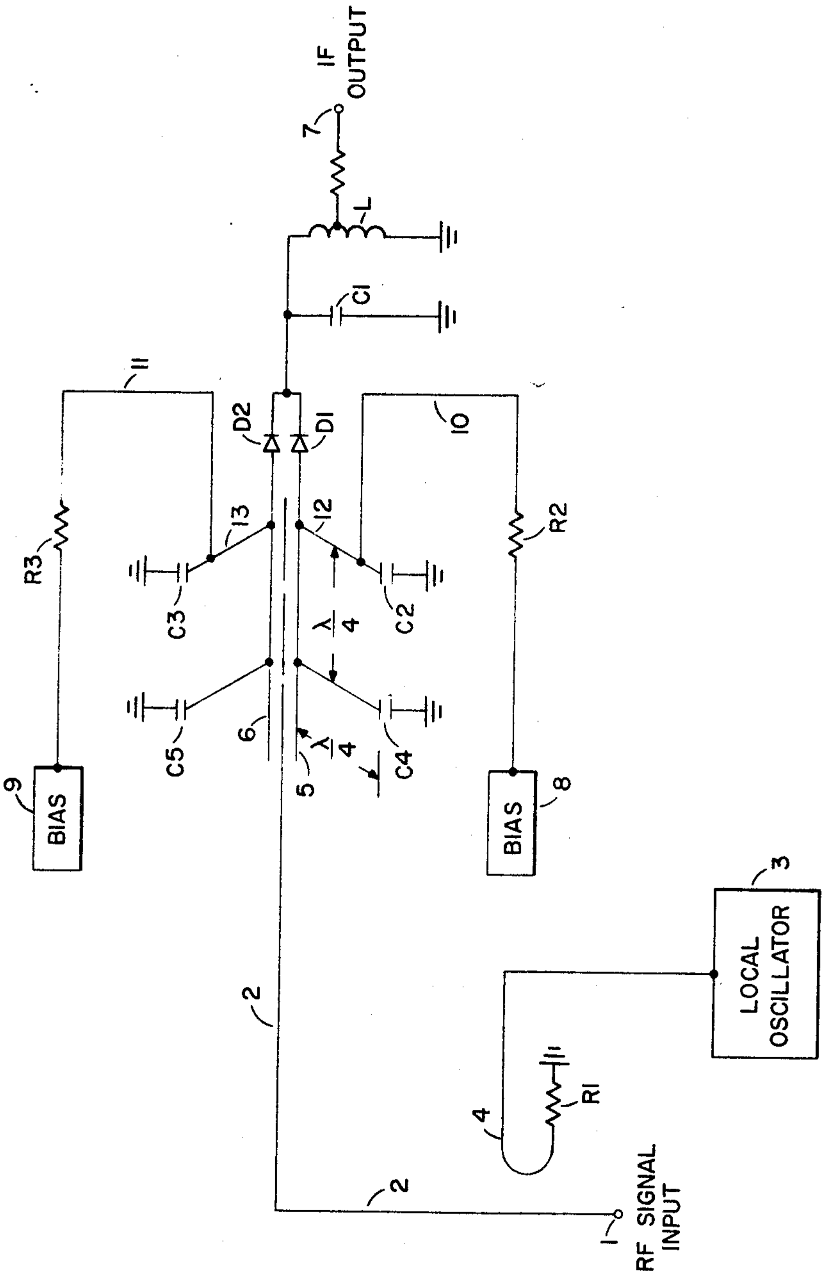
John Mattern,
INVENTOR.
BY Harry M. Saragovitz
Edward J. Kelly
Herbert Berl
Aubrey J. Dunn United States Patent Office 3,479,601

Patented Nov. 18, 1969

3,479,601

BALANCED SQUARE-LAW MICROWAVE MIXER

John Mattern, Baltimore, Md., assignor to the United States of America as represented by the Secretary of the Army Filed Oct. 5, 1966, Ser. No. 584,613
Int. Cl. H04b *1/26*
U.S. Cl. 325—449 7 Claims

ABSTRACT OF THE DISCLOSURE

Two semiconductor diodes (each having a square-law characteristic of voltage vs. current) are employed in the invention. The diodes are operated in parallel and with differential forward biases. The biases are such as to place each of the diodes and its source resistance in the square-law region. The biases of the diodes are slightly different, in order to extend the square-law region and give a good approximation to a square-law characteristic.

The types of balanced microwave mixers known to date do not take advantage of the square-law characteristics of diodes. A known type of balanced microwave mixer is that shown and described on pages 285–387 of the book "Introduction to Radar Systems" by Merrill I. Skolnik, published in 1962 by McGraw-Hill Book Company, Library of Congress Catalog Card No. 61–17675. The desirability of square-law characteristics in detectors is discussed on pages 558 and 559 of the book "Electronics and Radio Engineering," fourth edition, by Frederick E. Terman, published in 1955 by McGraw-Hill Book Company, Library of Congress Catalog Card No. 55–6174.

The invention employs two differentially biased diodes capacity coupled to a strip line. The diodes are connected together at their cathodes, and have a tuned circuit connected to the same point, at which an IF output is taken. The strip line is connected to an RF signal input, and through a directional coupler, local oscillator frequencies are also fed into the strip line.

Whereas the prior art balanced microwave diode mixers, such as that shown by Skolnik, use switching action, the invention uses square-law detection and thereby provides low intermodulation distortion.

An object of this invention is to provide a balanced square-law microwave mixer. Other objects will be obvious from the following description.

The invention may be best understood by reference to the single drawing figure, which is a schematic showing of the invention.

Referring now to the drawing, an RF signal input is applied to an input terminal 1 of a strip line 2. A local oscillator 3 is connected to strip line 2 through a directional coupler 4. Lines 5 and 6 are parallel to strip line 2 and signals on line 2 are capacitively coupled to lines 5 and 6. The anodes of diodes D1 and D2 are connected to lines 5 and 6 and the cathodes of these diodes are connected to one plate of a capacitor C1. This capacitor is used to tune an inductance L, which is a short length of strip line making ohmic contact with its ground plane at its end. Inductance (strip line) L is tapped at a point so as to provide proper impedance matching to an output terminal 7, such as 50 ohms. Bias voltages for D1 and D2 are provided by bias means 8 and 9, which are connected through resistors R2 and R3 and lines 10 and 11, respectively, to bypass capacitors C2 and C3. The bias voltages are conducted to the anodes of diodes D1 and D2 through lines 12 and 13, which are one-quarter wavelength long at the center frequency of the RF input. To minimize reflections from the bias lines, a pair of dummy capacitors C4 and C5 are located one-quarter wavelength ahead of C2 and C3, and with one-quarter wavelength lines connecting them to lines 5 and 6. Line 2 and lines 5 and 6 are all supported and separated by a thin dielectric film. Lines 10 and 11 are covered with attenuating material to suppress resonances therein. The output line, which goes from L to terminal 7 is covered with lossy material to attenuate the local oscillator frequency. By having diodes D1 and D2 separately coupled to line 2, it is possible to individually bias the diodes.

Resistors R1, R2, and R3 are normal current-limiting, voltage-dropping resistors.

It is to be understood that the strip line includes a ground plane, to which the circuit ground connections are made.

While a specific embodiment of the invention has been shown and described, other embodiments may be obvious to one skilled in the art, in light of this disclosure.

I claim:

1. A balanced square-law microwave mixer including an input line with an RF input signal applied thereto, means for adding a local mixer signal to said line, a pair of diodes capacitively coupled to said line, different voltage biasing means for each of said diode, one like electrode of said diodes being connected to each other and to a tuned output means.

2. The mixer of claim 1 wherein said input line is a strip line.

3. The mixer of claim 1 wherein said tuned output means includes parallel inductive and capacitive means.

4. The mixer of claim 1 wherein said means for adding includes an oscillator and a directional coupler.

5. The mixer of claim 1 wherein said different voltage biasing means includes means for isolating said bias means from said RF signals.

6. The mixer of claim 1 wherein said output means provides an IF output signal.

7. The mixer of claim 1 wherein said different voltage biasing means includes means for isolating said different voltage biasing means from said RF signals, said input line is a strip line, said means for adding includes an oscillator and a directional coupler, and wherein said output means includes parallel inductive and capacitive elements and provides an IF output signal.

References Cited

UNITED STATES PATENTS

| | | | |
|---|---|---|---|
| 3,092,774 | 6/1963 | Peppiatt | 325—445 |
| 3,111,634 | 11/1963 | Ammerman et al. | 332—52 |
| 3,189,836 | 6/1965 | Podell | 328—156 |

KATHLEEN H. CLAFFY, Primary Examiner

CHARLES JIRAUCH, Assistant Examiner

U.S. Cl. X.R.

325—446